(12) United States Patent
Kim et al.

(10) Patent No.: US 12,019,328 B2
(45) Date of Patent: Jun. 25, 2024

(54) COLOR CHANGING FILM, AND BACKLIGHT UNIT AND DISPLAY DEVICE WHICH COMPRISE SAME

(71) Applicant: LG CHEM, LTD., Seoul (KR)

(72) Inventors: Ji Ho Kim, Daejeon (KR); Dong Mok Shin, Daejeon (KR); Nari Kim, Daejeon (KR); Hye Mi Oh, Daejeon (KR); Sung Yong Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 314 days.

(21) Appl. No.: 16/629,084

(22) PCT Filed: Nov. 20, 2018

(86) PCT No.: PCT/KR2018/014257
§ 371 (c)(1),
(2) Date: May 8, 2020

(87) PCT Pub. No.: WO2019/107821
PCT Pub. Date: Jun. 6, 2019

(65) Prior Publication Data
US 2020/0270516 A1    Aug. 27, 2020

(30) Foreign Application Priority Data
Nov. 28, 2017    (KR) .................. 10-2017-0160682

(51) Int. Cl.
*C09K 11/06*    (2006.01)
*C09K 11/02*    (2006.01)
(Continued)

(52) U.S. Cl.
CPC ............ *G02F 1/1336* (2013.01); *C09K 11/02* (2013.01); *C09K 11/06* (2013.01);
(Continued)

(58) Field of Classification Search
CPC .... B32B 7/12; B32B 7/02; B32B 9/00; B32B 2307/40; B32B 2309/105; B32B 27/08;
(Continued)

(56) References Cited

U.S. PATENT DOCUMENTS

2004/0038057 A1    2/2004 Katoh et al.
2009/0026952 A1*   1/2009 Ahn ..................... C09K 11/025
                                               427/67
(Continued)

FOREIGN PATENT DOCUMENTS

CN    1483573 A    3/2004
CN    102369235 A    3/2012
(Continued)

OTHER PUBLICATIONS

Machine English Translation of KR201600097145A; Kim et al. (Year: 2016).*

(Continued)

*Primary Examiner* — Zheng Song
*Assistant Examiner* — Glenn Zimmerman
(74) *Attorney, Agent, or Firm* — ROTHWELL, FIGG, ERNST & MANBECK, P.C.

(57) ABSTRACT

The present disclosure provides a color conversion film, and a backlight unit and a display device comprising the color conversion film.

9 Claims, 4 Drawing Sheets

(51) Int. Cl.
*G02F 1/13357* (2006.01)
*G02F 1/1335* (2006.01)

(52) U.S. Cl.
CPC ............... *C09K 2211/1007* (2013.01); *C09K 2211/1018* (2013.01); *G02F 1/133614* (2021.01)

(58) Field of Classification Search
CPC ......... B32B 2250/244; B32B 2250/02; B32B 2255/10; B32B 2255/20; B32B 2255/26; B32B 2255/28; B32B 2307/306; B32B 2307/412; B32B 2307/7242; B32B 2307/732; B32B 2551/00; B32B 27/36; B32B 7/023; B32B 27/20; B32B 2307/4026; B32B 2307/404; B32B 2307/422; F21S 2/00; G02B 5/20; G02B 1/14; G02B 5/23; H01L 33/505; H01L 33/501; H01L 33/504; H01L 33/60; H01L 33/507; H01L 2933/0041; H01L 33/50; C08J 7/048; C08J 7/06; F21Y 2115/10; G02F 1/1336; G02F 1/133614; G02F 1/133615; C09K 11/02; C09K 11/06; C09K 2211/1007; C09K 2211/1018
See application file for complete search history.

(56) References Cited

U.S. PATENT DOCUMENTS

| | | | |
|---|---|---|---|
| 2011/0182072 A1* | 7/2011 | Shimizu | C09K 11/7739 362/293 |
| 2012/0113672 A1 | 5/2012 | Dubrow et al. | |
| 2012/0256198 A1* | 10/2012 | Huang | H01L 33/56 257/E33.012 |
| 2015/0301257 A1 | 10/2015 | Choi et al. | |
| 2015/0330604 A1 | 11/2015 | Tsukahara et al. | |
| 2016/0141468 A1* | 5/2016 | Li | B29C 39/025 156/278 |
| 2016/0161088 A1 | 6/2016 | Sung et al. | |
| 2016/0230960 A1 | 8/2016 | Seo et al. | |
| 2017/0159910 A1* | 6/2017 | Seo | G02F 1/133615 |
| 2017/0183567 A1* | 6/2017 | Zhou | G02F 1/133516 |
| 2017/0248809 A1 | 8/2017 | Oba et al. | |
| 2017/0261673 A1 | 9/2017 | Kim et al. | |
| 2017/0373229 A1* | 12/2017 | Shin | C09K 11/883 |
| 2018/0016490 A1 | 1/2018 | Shin et al. | |
| 2018/0194107 A1* | 7/2018 | Syoda | G02B 6/0026 |
| 2019/0039349 A1* | 2/2019 | Shoda | B32B 27/08 |
| 2019/0187514 A1* | 6/2019 | Kuniyasu | G02B 27/0977 |
| 2020/0230915 A1* | 7/2020 | Kurokawa | H01L 33/505 |

FOREIGN PATENT DOCUMENTS

| | | | | |
|---|---|---|---|---|
| CN | 107210346 A | 9/2017 | | |
| JP | 2002-124382 A | 4/2002 | | |
| JP | 2010-170961 A | 8/2010 | | |
| JP | 2016-215579 A | 12/2016 | | |
| KR | 10-1180636 B1 | 9/2012 | | |
| KR | 10-2014-0060218 A | 5/2014 | | |
| KR | 10-1604339 B1 | 3/2016 | | |
| KR | 10-2016-0094891 A | 8/2016 | | |
| KR | 10-2016-0097143 A | 8/2016 | | |
| KR | 10-2016-0097144 A | 8/2016 | | |
| KR | 10-2016-0097155 A | 8/2016 | | |
| KR | 20160097145 A * | 8/2016 | | |
| KR | 10-2017-0067073 A | 6/2017 | | |
| WO | WO-2016122286 A1 * | 8/2016 | | B82Y 10/00 |
| WO | WO-2016204166 A1 * | 12/2016 | | |
| WO | WO-2017043483 A1 * | 3/2017 | | B32B 27/00 |
| WO | WO-2017126609 A1 * | 7/2017 | | |
| WO | WO-2017179513 A1 * | 10/2017 | | B32B 23/04 |
| WO | WO-2019069827 A1 * | 4/2019 | | B32B 7/02 |

OTHER PUBLICATIONS

English Translation of WO-2017126609-A1; Light-emitting body protection film and method for manufacturing same, wavelength conversion sheet, and light emission unit; Kojima (Year: 2017).*
International Search Report and Written Opinion issued for International Application No. PCT/KR2018/014257 on Feb. 28, 2019, 11 pages.

* cited by examiner

[Figure 1]
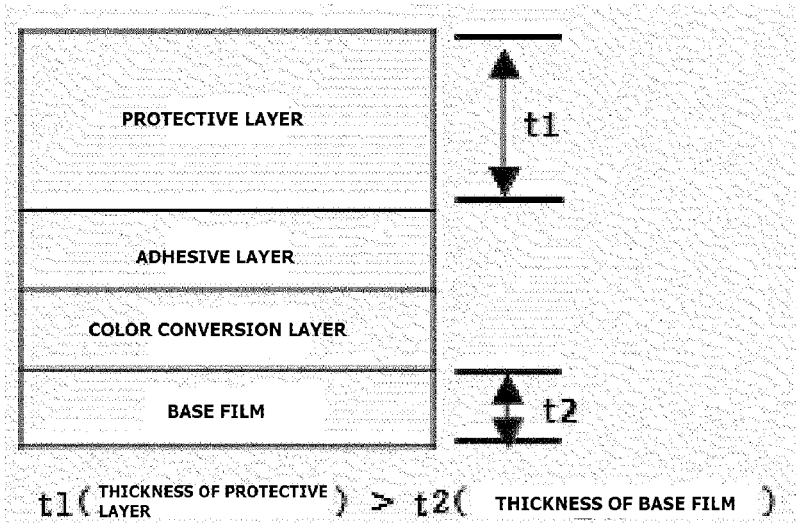
[Figure 2]
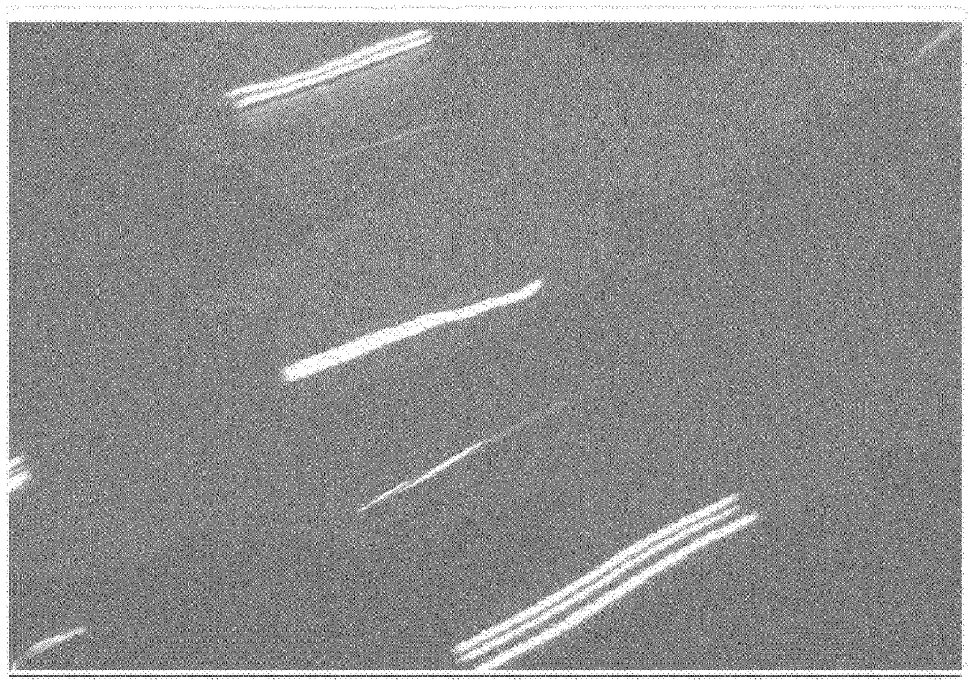

[Figure 3]
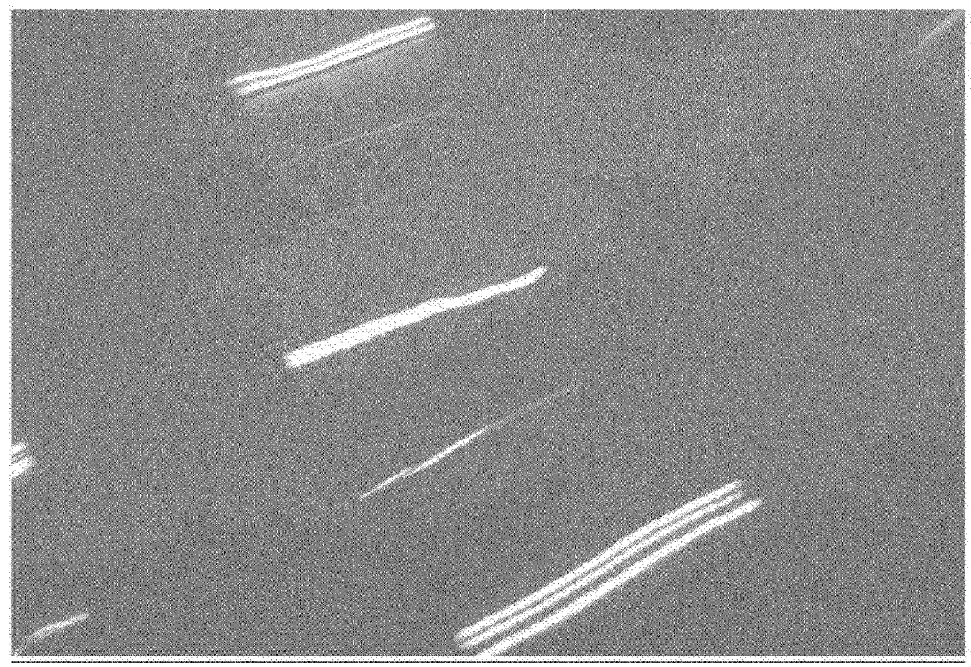
[Figure 4]
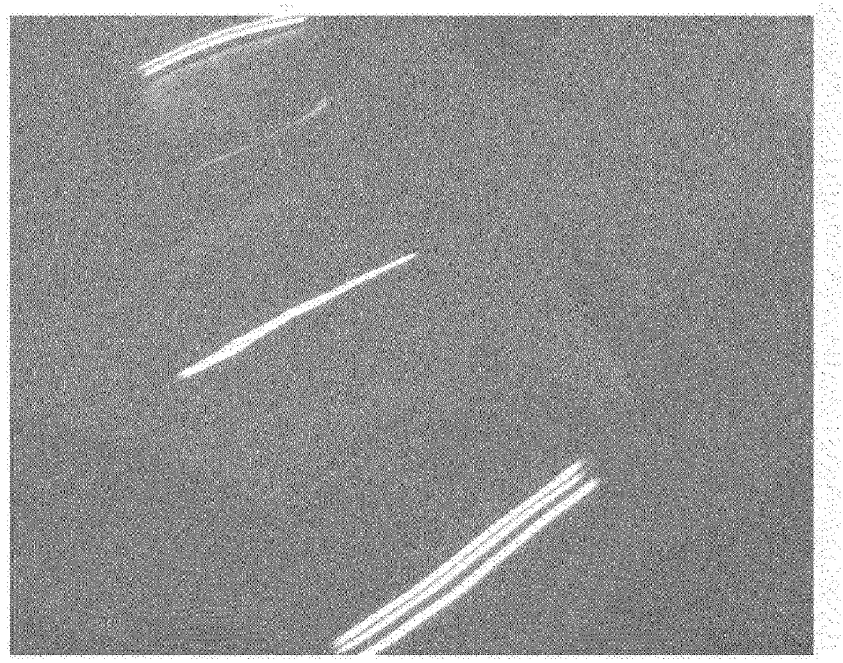

[Figure 5]
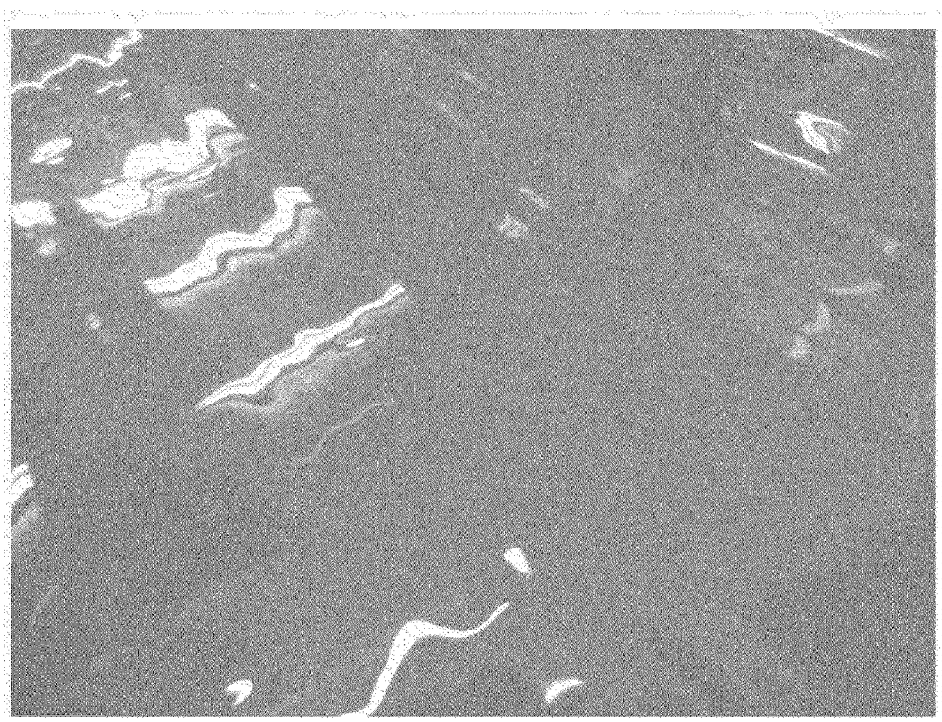
[Figure 6]
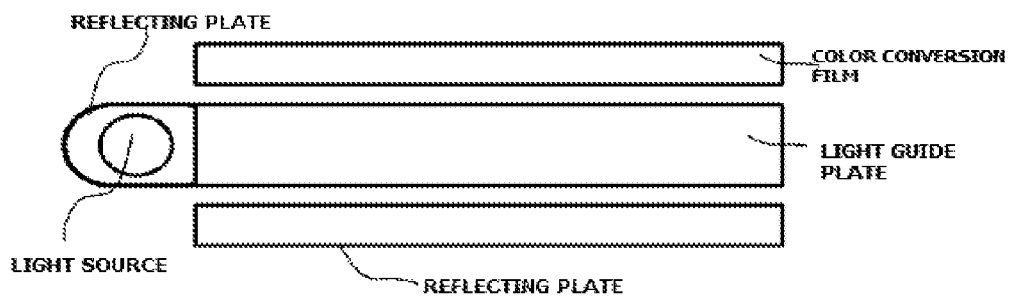

[Figure 7]
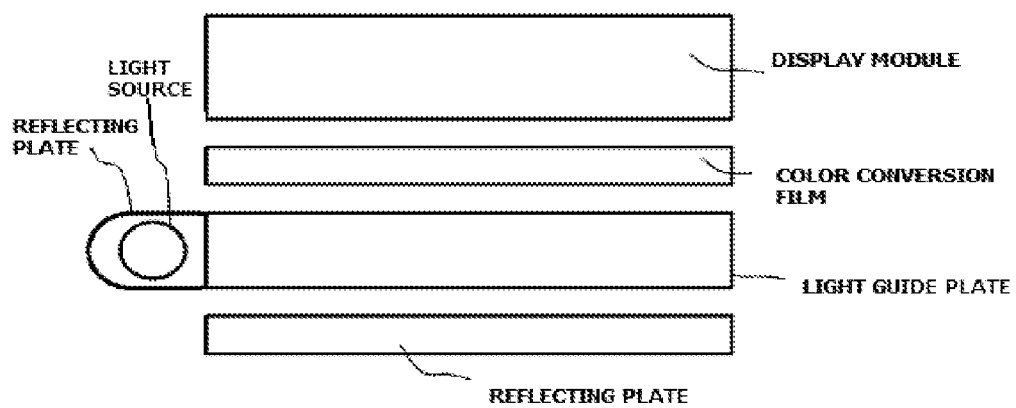

COLOR CHANGING FILM, AND BACKLIGHT UNIT AND DISPLAY DEVICE WHICH COMPRISE SAME

TECHNICAL FIELD

The present application is a 35 U.S.C. § 371 National Phase Entry Application from PCT/KR2018/014257, filed on Nov. 20, 2018, and designating the United States, which claims priority to and the benefit of Korean Patent Application No. 10-2017-0160682 filed in the Korean Intellectual Property Office on Nov. 28, 2017, the entire contents of which are incorporated herein by reference.

The present specification relates to a color conversion film, and a backlight unit and a display device, including the same.

BACKGROUND ART

In the related art, a color conversion film was manufactured by using a thermoplastic resin as a matrix and coating a PET film with the thermoplastic resin by a roll-to-roll process. In this case, a coating solution is produced by dissolving the thermoplastic resin in a solvent, and the remaining solvent in the coating needs to be dried after the coating. When the remaining solvent is present, the durability of the color conversion film deteriorates. Thus, the drying step is performed by setting the maximum temperature at 100° C. to 200° C. to remove the remaining solvent completely. In this case, the drying temperature is equal to or higher than the glass transition temperature (67° C. to 81° C.) of the PET film. Since tension is needed in the roll-to-roll process, heat shrinkage occurs, and as a result, there has been a problem of forming wrinkles in an original PET film.

DETAILED DESCRIPTION OF INVENTION

The present specification provides a color conversion film, and a backlight unit and a display device, including the same.

One exemplary embodiment of the present specification provides a color conversion film including: a base film; a color conversion layer provided on the base film; an adhesive layer provided on the color conversion layer; and a protective layer provided on the adhesive layer, in which the color conversion layer includes a resin matrix; and an organic fluorescent dye dispersed in the resin matrix, and a thickness of the protective layer is larger than a thickness of the base film.

According to another exemplary embodiment of the present specification provides a color conversion film in which a thickness ratio of the base film to the protective layer is 1:1.5 to 1:10.

According to another exemplary embodiment of the present specification provides a color conversion film in which the base film has a thickness of 1 μm or more and 100 μm or less.

According to another exemplary embodiment of the present specification provides a color conversion film in which the protective layer has a thickness of 1.5 μm or more and 1,000 μm or less.

According to another exemplary embodiment of the present specification provides a color conversion film in which the organic fluorescent dye includes one or more or both of a green light emitting fluorescent dye having a molecular absorption coefficient of 50,000 $M^{-1}cm^{-1}$ to 150,000 $M^{-1}cm^{-1}$ and a maximum light emission wavelength of 500 nm to 550 nm and a red light emitting fluorescent dye having a maximum light emission wavelength of 600 nm to 660 nm, the green light emitting fluorescent dye has a full width at half maximum (FWHM) of 70 nm or less, and the red light emitting fluorescent dye has a full width at half maximum (FWHM) of 90 nm or less.

According to another exemplary embodiment of the present specification provides a method for manufacturing a color conversion film, the method including: preparing a base film; forming a color conversion layer including a resin matrix on the base film and an organic fluorescent dye dispersed in the resin matrix; forming an adhesive layer on the color conversion layer; and forming a protective layer on the adhesive layer, in which a thickness of the protective layer is larger than a thickness of the base film.

According to another exemplary embodiment of the present specification provides a backlight unit including the color conversion film according to the above-described exemplary embodiments.

According to an exemplary embodiment of the present specification provides a display device including the backlight unit according to the above-described exemplary embodiments.

Advantageous Effects

A color conversion film according to exemplary embodiments of the present specification may effectively reduce wrinkles of a PET-base color conversion film occurring after being subjected to a coating/drying process by forming a thickness of a protective layer larger than a thickness of a base film.

BRIEF DESCRIPTION OF DRAWINGS

FIG. 1 exemplifies a structure of a color conversion film according to an embodiment of the present specification.

FIG. 2 is a photograph illustrating wrinkles of a PET-base color conversion film manufactured in Example 1.

FIG. 3 is a photograph illustrating wrinkles of a PET-base color conversion film manufactured in Example 2.

FIG. 4 is a photograph illustrating wrinkles of a PET-base color conversion film manufactured in Example 3.

FIG. 5 is a photograph illustrating wrinkles of a PET-base color conversion film manufactured in the Comparative Example.

FIG. 6 is a schematic view in which a color conversion film according to an exemplary embodiment of the present specification is applied to a backlight.

FIG. 7 is a schematic view illustrating a structure of a display device according to an exemplary embodiment of the present specification.

BEST MODE

Hereinafter, the present specification will be described in more detail.

In the present specification, "on" means not only being disposed while being physically brought into contact with one layer, but also being disposed on the layer at a position. That is, a layer disposed on any one layer may also have another layer therebetween.

When one part "includes" one constituent element in the present specification, unless otherwise specifically described, this does not mean that another constituent element is excluded, but means that another constituent element may be further included.

A color conversion film according to an exemplary embodiment of the present specification includes: a base film; a color conversion layer provided on the base film; an adhesive layer provided on the color conversion layer; and a protective layer provided on the adhesive layer, in which the color conversion layer includes a resin matrix; and an organic fluorescent dye dispersed in the resin matrix, and a thickness of the protective layer is larger than a thickness of the base film. A structure of a color conversion film according to an example is exemplified in FIG. 1.

Specifically, FIG. 1 exemplifies a structure of a color conversion film in which a thickness (t1) of a protective layer is formed to be larger than a thickness (t2) of a base film.

In general, when a color conversion film is manufactured by using a thermoplastic resin as a matrix and coating a base film with the thermoplastic resin by a roll-to-roll process, after the coating, the color conversion film is subjected to a process of drying the solvent, and in this case, when the remaining solvent is present, the durability of the color conversion film deteriorates, so that the solvent needs to be completely removed by being subjected to a drying process at a temperature within a range of, for example, 100° C. to 200° C.

However, the temperature is equal to or more than the glass transition temperature (67° C. to 81° C.) of the base film and tension is needed in the roll-to-roll process, so that heat shrinkage occurs during the drying process, and as a result, wrinkles occur in the base film.

In the color conversion film according to an exemplary embodiment of the present specification, it is possible to effectively alleviate a problem in that wrinkles of the PET film generated by the drying process occur by forming the protective layer to be larger than a thickness of the base film. FIGS. 2 to 4 illustrate photographs in which wrinkles of the base film are alleviated when the protective layer is formed to be larger than the thickness of the base film.

According to exemplary embodiment of the present specification, a thickness ratio of the base film to the protective layer may be 1:1.5 to 1:10.

According to exemplary embodiment of the present specification, a thickness ratio of the base film to the protective layer may be 1:1.5 to 1:5.

As the protective layer, those known in the art may be used. For example, a polyethylene terephthalate (PET) film, a polyethylene naphthalene (PEN) film, or a barrier film may be used.

The barrier film is not particularly limited as long as the barrier film is a layer capable of blocking moisture or oxygen, and those known in the art may be used. For example, the barrier film includes a barrier layer having a permeability of at least one of moisture and oxygen of $10^{-1}$ cc/m²/day or less. For example, the barrier layer may include aluminum oxide or nitride, and ionic metal oxide imparting a moisture or oxygen blocking property. The barrier film may further include a buffer layer formed with one or more types selected from sol-gel-based, acrylic, epoxy-based and urethane-based coating solution compositions as a buffer layer.

As an example, the barrier film may include an organic-inorganic hybrid coating layer, an inorganic material layer and a protective coating layer including inorganic nanoparticles of which surfaces are modified with organosilane on one or both surfaces of a base film. Here, the inorganic material layer may be formed with metal oxides or nitrides. The inorganic nanoparticles may be nanoparticles of alumina, silica, zinc oxide, antimony oxide, titanium oxide or zirconium oxide. The organic-inorganic hybrid coating layer may be formed by curing a coating composition in a sol state including organosilane using heat or UV, and the coating solution composition in a sol state may include, together with the organosilane, proper additives, solvents, polymerization catalysts and the like in some cases.

According to another exemplary embodiment of the present specification, the base film may have a thickness of 1 μm or more and 100 μm or less, more specifically 10 μm or more and 90 μm or less, and preferably 20 μm or more and 80 μm or less.

According to another exemplary embodiment of the present specification, the protective layer may have a thickness of 1.5 μm or more and 1,000 μm or less, more specifically 20 μm or more and 500 μm or less, and preferably 30 μm or more and 200 μm or less.

According to another exemplary embodiment of the present specification, as the organic fluorescence dye, it is possible to use a dye selectively absorbing light in a region from near-ultraviolet to visible, and emitting light having a wavelength different from the absorbed light. For example, the organic fluorescent dye may include one or more or both of a green light emitting fluorescent dye having a maximum light emission wavelength of 500 nm to 550 nm and a red light emitting fluorescent dye having a maximum light emission wavelength of 600 nm to 660 nm. The green light emitting fluorescent dye may have a full width at half maximum (FWHM) of 70 nm or less, and the red light emission fluorescent dye may have a full width at half maximum (FWHM) of 90 nm or less.

Although the organic fluorescent dye is not particularly limited, acridine-based, xanthene-based, arylmethane-based, coumarin-based, polycyclic aromatic hydrocarbon-based, polycyclic heteroaromatic-based, perylene-based, pyrrole-based, pyrene-based derivatives, and the like are preferred as the organic fluorescent dye. The aforementioned materials are an example of the organic fluorescent dye, various organic fluorescent dyes other than the materials may be used, but the organic fluorescent dye is not limited thereto. Preferably, as the organic fluorescent dye, those having a molecular absorption coefficient of 50,000 $M^{-1}cm^{-1}$ to 150,000 $M^{-1}cm^{-1}$ may be used.

In the present specification, the full width at half maximum means, when light is emitted by converting light absorbed from an external light source into light having a different wavelength, a width of a light emission peak at the half of the maximum height in the maximum light emission peak of the emitted light. In the present specification, the full width at half maximum is measured in a film state. The full width at half maximum of a light emission peak in a film state of an organic fluorescent dye means those measured by irradiating the organic fluorescent dye in a state prepared in a film form instead of a solution state with light by using the organic fluorescent dye alone or mixing with other components that do not affect the measurement of the full width at half maximum. More preferably, all fluorescent dyes dissolved in polar solvents may be used, and cationic or anionic organic fluorescent dyes are more preferred although the fluorescent dyes are not divided into cationic, anionic and neutral dyes.

The content of the organic fluorescent dye may be 0.005 part by weight to 2 parts by weight based on 100 parts by weight of the resin matrix.

It is preferred that a material for the resin matrix is a thermoplastic polymer or a thermosetting polymer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (PU)-based material, a styrene-acrylonitrile (SAN)-based material, a polyvinylidenefluoride (PVDF)-based material, a modified-polyvinylidene-fluoride (modified-PVDF)-based material, and the like.

The color conversion layer according to the above-described exemplary embodiment may have a thickness of 2 µm to 200 µm. In particular, the color conversion layer may exhibit high brightness even in a small thickness of 2 µm to 20 µm. This is because the content of fluorescent substance molecules included in a unit volume is higher than that of quantum dots. For example, a 5 µm-thick color conversion film to which a 0.5 wt % content of the organic fluorescent dye is applied may show a high brightness of 4,000 nit or more based on a brightness of 600 nit of a blue backlight unit (blue BLU).

The color conversion film according to the above-described exemplary embodiment has a base film provided on one surface thereof. The base film may function as a support when manufacturing the color conversion film. The base film is provided at an opposite surface side of a surface of the color conversion layer facing the adhesive layer. The type of base film is not particularly limited, and the material or thickness of the base material is not limited as long as the base material is transparent and may function as the support. Here, transparency means that the transmittance of visible light is 70% or more. For example, as the base film, a PET film may be used. If necessary, the base film may be replaced with a barrier film.

The color conversion layer may be manufactured by using a method including: coating a resin solution in which an organic fluorescent dye is dissolved onto a base film; and drying the resin solution coated on the base film, or a method including extruding an organic fluorescent substance together with a resin.

Since the above-described organic fluorescent dye is dissolved in the resin solution, the organic fluorescent dye is homogeneously distributed in the solution. This is different from a process of producing a quantum dot film, which requires a separate dispersing process.

As for the resin solution in which the organic fluorescent dye is dissolved, the production method is not particularly limited as long as the organic fluorescent dye and the resin described above are dissolved in the solution.

According to an example, the resin solution in which the organic fluorescent dye is dissolved may be produced by using a method of preparing a first solution by dissolving an organic fluorescent dye in a solvent, preparing a second solution by dissolving a resin in a solvent, and mixing the first solution and the second solution. When the first solution and the second solution are mixed, it is preferred to homogeneously mix the solutions. However, the method is not limited thereto, and it is possible to use a method of simultaneously adding and dissolving an organic fluorescent dye and a resin in a solvent, a method of dissolving an organic fluorescent dye in a solvent and subsequently adding and dissolving a resin thereto, a method of dissolving a resin in a solvent and subsequently adding and dissolving an organic fluorescent dye thereto, and the like.

The organic fluorescent dye included in the solution is the same as described above.

As the resin included in the solution, it is possible to use the above-described resin matrix material, a monomer which is curable by the matrix resin, or a mixture thereof. Examples of the monomer which is curable by the resin matrix include a (meth)acrylic monomer, and the monomer may be formed as a resin matrix material by UV curing. When a curable monomer is used as described above, an initiator required for curing may be further added, if necessary.

The solvent is not particularly limited, and is not particularly limited as long as the solvent does not adversely affect the coating process and may be removed by a subsequent drying. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, cyclohexanone, propylene glycol methylethyl acetate (PG-MEA), dioxane, dimethylformamide (DMF), dimethylacetamide (DMAc), dimethylsulfoxide (DMSO), N-methyl-pyrrolidone (NMP), and the like, and one type or a mixture of two or more types may be used. When the first solution and the second solution are used, the solvents included in each of the solutions may also be the same as or different from each other. Even when different solvents are used in the first solution and the second solution, it is preferred that these solvents have compatibility so as to be mixed with each other.

A process of coating the resin solution, in which the organic fluorescent dye is dissolved, onto a base film may use a roll-to-roll process. For example, the process may be performed by a process of unwinding a base material from a roll on which the base film is wound, coating a resin solution, in which the organic fluorescent dye is dissolved, onto one surface of the base film, drying the resin solution, and then winding the base film again on the roll. When the roll-to-roll process is used, it is preferred that the viscosity of the resin solution is determined within a range in which the process may be implemented, and the viscosity may be determined within a range of, for example, 200 cps to 2,000 cps.

As the coating method, various publicly-known methods may be used, and for example, a die coater may also be used, and various bar-coating methods such as a comma coater and a reverse comma coater may also be used.

After the coating, a drying process is performed. The drying process may be performed under conditions required for removing the solvent. For example, a color conversion layer including a fluorescent substance having desired thickness and concentration may be obtained on a base film by carrying out the drying in an oven located close to a coater under a condition to sufficiently evaporate a solvent, in a direction of the base film progressing during the coating process.

When the monomer which is curable by the resin matrix is used as a resin included in the solution, curing, for example, UV curing may be performed before the drying or simultaneously with the drying.

When the organic fluorescent dye is filmed by being extruded with a resin, an extrusion method known in the art may be used, and for example, a color conversion layer may be manufactured by extruding an organic fluorescent dye with a resin such as a polycarbonate (PC)-based resin, a poly(meth)acrylic resin, and a styrene-acrylonitrile (SAN)-based resin.

An adhesive or bonding layer may be formed on the color conversion layer manufactured as described above. The adhesive or bonding layer may also be formed by applying a composition for forming an adhesive or bonding layer, and then polymerizing or curing the composition, and may also be formed by a method of attaching an adhesive or bonding sheet on the color conversion layer. The adhesive or bonding sheet may also be polymerized or cured after being attached to the color conversion layer, but may also be polymerized or cured before being attached to the color conversion layer, if necessary. Light diffusion particles may be dispersed in the composition for forming an adhesive or bonding layer to disperse the light diffusion particles in an adhesive or bonding layer. In this case, light diffusion particles may also be directly dispersed in a composition for forming an adhesive or bonding layer, and the dispersity of light diffusion particles may be increased by mixing a dispersion, in which the light diffusion particles are dispersed in a separate solvent, with the composition for forming an adhesive or bonding layer. If necessary, a sonicator or a shaker may be used in order to disperse light diffusion particles in a solvent.

Another exemplary embodiment of the present application provides a backlight unit including the above-described color conversion film. The backlight unit may have a backlight unit configuration known in the art, except that the backlight unit includes the color conversion film. According to an exemplary embodiment, the backlight unit includes a light guide plate, a light source provided so as to irradiate the light guide plate with light, and a reflective plate provided at one side of the light guide plate, in which the above-described color conversion film is provided between the light guide plate and the reflective plate, or on a surface opposite to a surface of the light guide plate facing the reflective plate. For example, FIGS. 6 and 7 illustrate an example of the backlight unit. According to FIG. 6, the color conversion film according to the above-described exemplary embodiments is provided between a light guide plate and a reflective plate. The adhesive or bonding layer of the color conversion film may also be attached to a light guide plate, or may also be attached to a reflective plate. According to FIG. 6, the color conversion film according to the above-described exemplary embodiments is provided on a surface opposite to a surface of a light guide plate facing a reflective plate. The adhesive or bonding layer of the color conversion film may also be attached to a light guide plate, or may also be attached to another film provided on a surface opposite to a surface close to the light guide plate. FIGS. 6 and 7 illustrate a configuration including a light source and a reflective plate surrounding the light source, but the configuration is not limited to such a structure, and may be modified depending on the structure of the backlight unit known in the art. Further, as a light source, a direct type as well as a side chain type may be used, and a reflective plate or a reflective layer may be omitted or replaced with other configurations, if necessary, and an additional film, for example, a light diffusion film, a light collecting film, a brightness enhancement film, and the like may be further provided, if necessary.

Hereinafter, the present specification will be described in detail with reference to Examples for specifically describing the present specification. However, the Examples according to the present specification may be modified in various forms, and it is not interpreted that the scope of the present application is limited to the Examples described in detail below. The Examples of the present application are provided for more completely explaining the present specification to the person with ordinary skill in the art.

[Mode for Invention]

Example 1

A first solution was produced by dissolving a green fluorescent substance and a red fluorescent substance, having the following structural formulae, at a molar ratio of 50:1 in a solvent xylene.

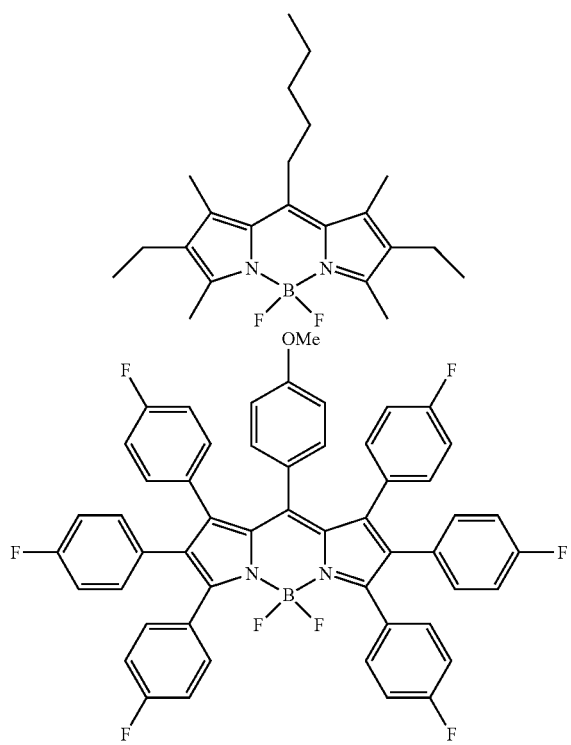

A second solution was produced by dissolving a thermoplastic resin (PS) in the solvent xylene. The first solution and the second solution were mixed and homogeneously mixed, such that the content of the green fluorescent substance and the red fluorescent substance was 0.45 part by weight and the content of $TiO_2$ particles was 10 parts by weight based on 100 parts by weight of the thermoplastic resin. A color conversion layer was formed by coating the solution onto a PET base film having a thickness of 50 μm, and then drying the PET base film. Thereafter, an adhesive layer was formed by applying a composition for forming an adhesive layer (LG Chem. TR300) on the color conversion layer, and a color conversion film was manufactured by attaching a polyethylene terephthalate (PET) film having a thickness of 75 μm as a protective layer to the adhesive layer. The manufactured color conversion film was placed on the floor in a state where tension was not present, the degree of wrinkles was captured by a digital camera, and the results are illustrated in FIG. 2. According to FIG. 2 and in comparison with FIG. 5, it could be confirmed that wrinkles of the PET base color conversion film occurring after the PET base film was subjected to a coating/drying process, were effectively alleviated.

Example 2

An experiment was performed in the same manner as in Example 1, except that a polyethylene terephthalate (PET) film having a thickness of 125 μm was used as the protective layer. The degree of wrinkles of the PET base film of the manufactured color conversion film was captured, and the results are illustrated in FIG. 3.

Example 3

An experiment was performed in the same manner as in Example 1, except that a polyethylene terephthalate (PET)

film having a thickness of 188 µm was used as the protective layer. The degree of wrinkles of the PET base film of the manufactured color conversion film was captured, and the results are illustrated in FIG. 4.

Comparative Example

An experiment was performed in the same manner as in Example 1, except that a polyethylene terephthalate (PET) film having a thickness of 50 µm was used as the protective layer. The degree of wrinkles of the PET base film of the produced color conversion film was captured, and the results are illustrated in FIG. 5.

The invention claimed is:

1. A color conversion film consisting of:
   a base film;
   a color conversion layer provided on the base film;
   an adhesive layer provided on the color conversion layer; and
   a protective layer provided on the adhesive layer,
   wherein the color conversion layer comprises a resin matrix and an organic fluorescent dye dispersed in the resin matrix,
   the adhesive layer is in direct contact with the color conversion layer, and
   a thickness of the protective layer is larger than a thickness of the base film,
   wherein the adhesive layer comprises light diffusion particles,
   wherein the adhesive layer is in contact with both the color conversion layer and the protective layer, wherein the protective layer has a thickness of 125 µm or more and 1,000 µm or less,
   wherein a thickness ratio of the base film to the protective layer is 1:1.5 to 1:10,
   wherein the protective layer is a single layer consisting of polyethylene terephthalate (PET) or polyethylene naphthalene (PEN),
   wherein the base film consists of a PET film, and
   wherein the base film is provided directly on the color conversion layer on an opposite surface side of the color conversion layer facing the adhesive layer.

2. The color conversion film of claim 1, wherein the base film has a thickness of 1 µm or more and 50 µm or less.

3. The color conversion film of claim 1, wherein the organic fluorescent dye comprises at least one green light emitting fluorescent dye having a maximum light emission wavelength of 500 nm to 550 nm, at least one red light emitting fluorescent dye having a maximum light emission wavelength of 600 nm to 660 nm or both of the at least one green light emitting fluorescent dye and the at least one red light emitting fluorescent dye,
   wherein the green light emitting fluorescent dye has a full width at half maximum (FWHM) of 70 nm or less, and
   wherein the red light emitting fluorescent dye has a full width at half maximum (FWHM) of 90 nm or less.

4. A method for manufacturing the color conversion film according to claim 1, the method comprising:
   providing the base film;
   forming, on the base film, the color conversion layer comprising the resin matrix and the organic fluorescent dye dispersed in the resin matrix;
   forming the adhesive layer on the color conversion layer; and
   forming the protective layer on the adhesive layer,
   wherein the thickness of the protective layer is larger than the thickness of the base film, and
   wherein the adhesive layer comprises the light diffusion particles,
   wherein the adhesive layer is in contact with both the color conversion layer and the protective layer, wherein the protective layer has a thickness of 125 µm or more and 1,000 µm or less,
   wherein a thickness ratio of the base film to the protective layer is 1:1.5 to 1:10,
   wherein the protective layer is a single layer consisting of polyethylene terephthalate (PET) or polyethylene naphthalene (PEN),
   wherein the base film consists of a PET film, and
   wherein the base film is provided directly on the color conversion layer on an opposite surface side of the color conversion layer facing the adhesive layer.

5. The method of claim 4, wherein the resin matrix comprises a thermoplastic resin.

6. The method of claim 4, wherein the forming of the color conversion layer comprises coating the base film with a resin solution comprising the organic fluorescent dye by a roll-to-roll process.

7. The method of claim 6, wherein the forming of the color conversion layer further comprises drying at a temperature within a range of 100° C. to 200° C. after the coating.

8. A backlight unit comprising the color conversion film according to claim 1.

9. A display device comprising the backlight unit according to claim 8.

* * * * *